US011722546B2

(12) United States Patent
Wayama

(10) Patent No.: US 11,722,546 B2
(45) Date of Patent: Aug. 8, 2023

(54) SYSTEM, RELAY SERVER, AND DATA STORAGE SERVER

(71) Applicant: Canon Kabushiki Kaisha, Tokyo (JP)

(72) Inventor: Hiroshi Wayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/218,405

(22) Filed: Mar. 31, 2021

(65) Prior Publication Data

US 2021/0306441 A1 Sep. 30, 2021

(30) Foreign Application Priority Data

Mar. 31, 2020 (JP) .................................. 2020-064199

(51) Int. Cl.
| | | |
|---|---|---|
| H04L 12/24 | (2006.01) | |
| H04L 41/0803 | (2022.01) | |
| H04L 67/01 | (2022.01) | |
| H04L 67/1097 | (2022.01) | |
| H04L 67/147 | (2022.01) | |
| H04L 67/303 | (2022.01) | |
| H04L 67/561 | (2022.01) | |
| G06F 3/12 | (2006.01) | |

(52) U.S. Cl.
CPC .......... *H04L 67/01* (2022.05); *H04L 67/1097* (2013.01); *H04L 67/147* (2013.01); *H04L 67/303* (2013.01); *H04L 67/561* (2022.05); *G06F 3/12* (2013.01)

(58) Field of Classification Search
CPC ... H04L 67/01; H04L 67/1097; H04L 67/147; H04L 67/303; H04L 67/561; H04L 67/02; H04L 67/55; H04L 69/329; H04L 67/10; G06F 3/12; G06F 3/1203; G06F 3/1231; G06F 3/1287
USPC ........................................................ 709/203
See application file for complete search history.

(56) References Cited

U.S. PATENT DOCUMENTS

| | | | | |
|---|---|---|---|---|
| 2003/0023450 | A1* | 1/2003 | Casati | G06Q 10/10 717/136 |
| 2004/0030740 | A1* | 2/2004 | Stelting | H04L 67/02 709/201 |
| 2006/0235742 | A1* | 10/2006 | Castellanos | G06Q 30/0201 705/7.29 |
| 2008/0140857 | A1* | 6/2008 | Conner | H04L 67/51 709/236 |

(Continued)

FOREIGN PATENT DOCUMENTS

JP 2017073167 4/2017

*Primary Examiner* — Moustafa M Meky
*Assistant Examiner* — Elizabeth Kassa
(74) *Attorney, Agent, or Firm* — Venable LLP

(57) ABSTRACT

A relay server manages information that links a client terminal and a service provided by a service providing server; based on the information managed, gives information of the service corresponding to the client terminal as attribute information to data transmitted from the client terminal; and transmits, to a data storage server, the data given the attribute information. The data storage server comprises a storage unit configured to store the data transmitted in a storage area. The service providing server acquires data extracted from data stored in the storage unit by designating the attribute information, and corresponding to the service provided by the service providing server.

13 Claims, 11 Drawing Sheets

(56) References Cited

U.S. PATENT DOCUMENTS

| | | | |
|---|---|---|---|
| 2012/0246221 A1* | 9/2012 | Miyawaki | H04L 63/101 709/203 |
| 2013/0010324 A1* | 1/2013 | Towata | G06F 3/1272 358/1.15 |
| 2013/0019300 A1* | 1/2013 | Uchida | G06F 21/41 726/8 |
| 2013/0321859 A1* | 12/2013 | Ohara | H04N 1/00244 358/1.15 |
| 2014/0137194 A1* | 5/2014 | Nagasaki | G06F 3/1292 726/3 |
| 2014/0244794 A1* | 8/2014 | Nakadai | H04L 67/104 709/217 |
| 2015/0373211 A1* | 12/2015 | Minamikawa | H04N 1/00474 358/1.15 |
| 2018/0203890 A1* | 7/2018 | Chari | G06F 9/45512 |
| 2018/0375923 A1* | 12/2018 | Urakawa | G06F 3/1285 |
| 2019/0068741 A1* | 2/2019 | Mukai | H04L 67/568 |
| 2021/0050008 A1* | 2/2021 | Ward | G10L 15/22 |
| 2021/0099358 A1* | 4/2021 | Nishizaki | H04L 41/20 |

* cited by examiner

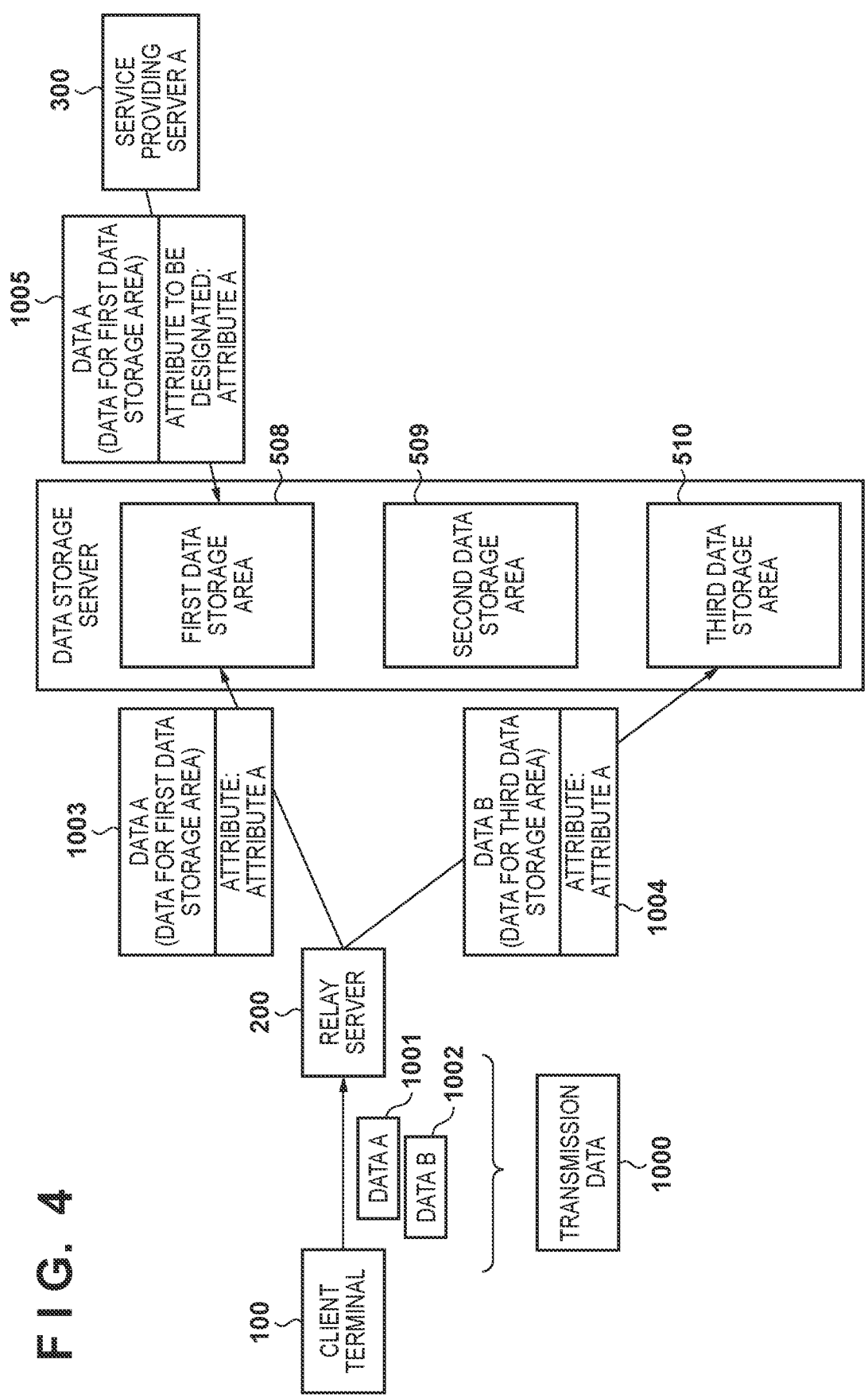

FIG. 5

DATA TO BE TRANSMITTED FROM CLIENT TERMINAL 100

1001

| | |
|---|---|
| SERIAL NUMBER | XXX-YYY-001 |
| MODEL NAME | ABC |
| ROM VERSION | Ver1.1.1 |
| SHEET TYPE | NORMAL |
| SHEET SIZE | A4 |
| NUMBER OF PRINTED SHEETS | 1000 SHEETS |
| CONSUMPTION AMOUNT OF INK | 100ml |
| EXCHANGE COUNT OF INK TANK | 10 TIMES |
| INDIVIDUAL INFORMATION OF INK TANK | Ink-abc |
| FINAL CLEANING DATE/TIME | 2018/1/1 |
| CLEANING COUNT | 10 |
| MAC ADDRESS | AA:AA:BB:BB:CC:CC |
| METHOD FOR ENCRYPTION | AES |
| TERMINAL TEMPERATURE | 30° |
| DETAIL INFORMATION OF ERROR | — |

1002

| | |
|---|---|
| SERIAL NUMBER | XXX-YYY-001 |
| MODEL NAME | ABC |
| ROM VERSION | Ver1.1.1 |
| REMAINING INK AMOUNT : BLACK | Low |
| REMAINING INK AMOUNT : MAGENTA | Full |
| REMAINING INK AMOUNT : YELLOW | Full |
| REMAINING INK AMOUNT : CYAN | Full |

ATTRIBUTE VALUE PROVIDED BY RELAY SERVER AND DATA STORAGE AREA OF DATA STORAGE SERVER

1003

| | |
|---|---|
| SERIAL NUMBER | XXX-YYY-001 |
| MODEL NAME | ABC |
| ROM VERSION | Ver1.1.1 |
| SHEET TYPE | NORMAL |
| SHEET SIZE | A4 |
| NUMBER OF PRINTED SHEETS | 1000 SHEETS |
| CONSUMPTION AMOUNT OF INK | 100ml |
| EXCHANGE COUNT OF INK TANK | 10 TIMES |
| INDIVIDUAL INFORMATION OF INK TANK | Ink-abc |
| FINAL CLEANING DATE/TIME | 2018/1/1 |
| CLEANING COUNT | 10 |
| MAC ADDRESS | AA:AA:BB:BB:CC:CC |
| METHOD FOR ENCRYPTION | AES |
| TERMINAL TEMPERATURE | 30° |
| DETAIL INFORMATION OF ERROR | — |
| DATA STORAGE AREA | FIRST DATA STORAGE AREA |
| ATTRIBUTE | ATTRIBUTE A |
| DATA RECEPTION DAY | 20190807125614 |

1004

| | |
|---|---|
| SERIAL NUMBER | XXX-YYY-001 |
| MODEL NAME | ABC |
| ROM VERSION | Ver1.1.1 |
| REMAINING INK AMOUNT : BLACK | Low |
| REMAINING INK AMOUNT : MAGENTA | Full |
| REMAINING INK AMOUNT : YELLOW | Full |
| REMAINING INK AMOUNT : CYAN | Full |
| DATA STORAGE AREA | THIRD DATA STORAGE AREA |
| ATTRIBUTE VALUE | ATTRIBUTE A |
| DATA RECEPTION DAY | 20190807114623 |

SYSTEM, RELAY SERVER, AND DATA STORAGE SERVER

BACKGROUND OF THE INVENTION

Field of the Invention

The present invention relates to a system including a service providing server capable of providing a service to a client terminal, a relay server, and a data storage server.

Description of the Related Art

As the number of services provided on the Internet increases, the number of client terminals connected to the Internet are also more and more increasing. For some services, a relay server is installed in order to manage client terminals, and services are provided via the relay server. For example, when a client terminal is an inkjet recording type printing apparatus, a service providing server provided on a cloud service transmits a print command to the client terminal via the relay server, thereby providing a print service. Accordingly, the user can print photographs and the like saved on the cloud service by using the printing apparatus. To implement a service like this in real time, the service providing server for providing the service, the relay server, and the client terminal are connected to the Internet so that they can communicate with each other. Japanese Patent Laid-Open No. 2017-73167 describes an arrangement in which the relay server and the service providing server exchange data.

SUMMARY OF THE INVENTION

The present invention provides a system that suppresses an influence on the system caused by a change in configuration of a relay server when a service providing server for obtaining data of a client terminal is added anew, the relay server, and a data storage server.

The present invention in one aspect provides a system including a client terminal and a service providing server configured to provide a service to the client terminal, wherein the system comprises: a relay server configured to manage the client terminal and the service providing server; and a data storage server installed between the relay server and the service providing server, the relay server comprises: a management unit configured to manage information that links the client terminal and the service provided by the service providing server; a giving unit configured to, based on the information managed by the management unit, give information of the service corresponding to the client terminal as attribute information to data transmitted from the client terminal; and a first transmission unit configured to transmit, to the data storage server, the data given the attribute information by the giving unit, the data storage server comprises a storage unit configured to store the data transmitted by the first transmission unit in a storage area, and the service providing server comprises an acquisition unit configured to acquire data extracted from data stored in the storage unit by designating the attribute information, and corresponding to the service provided by the service providing server.

The present invention can suppress an influence on the system caused by a change in configuration of the relay server when the service providing server for obtaining data of the client terminal is added anew.

Further features of the present invention will become apparent from the following description of exemplary embodiments with reference to the attached drawings.

BRIEF DESCRIPTION OF THE DRAWINGS

FIG. 4 is a view for explaining the transmission of data to a data storage server;

FIG. 5 is a view for explaining the transmission of data to the data storage server;

DESCRIPTION OF THE EMBODIMENTS

Figure 1:
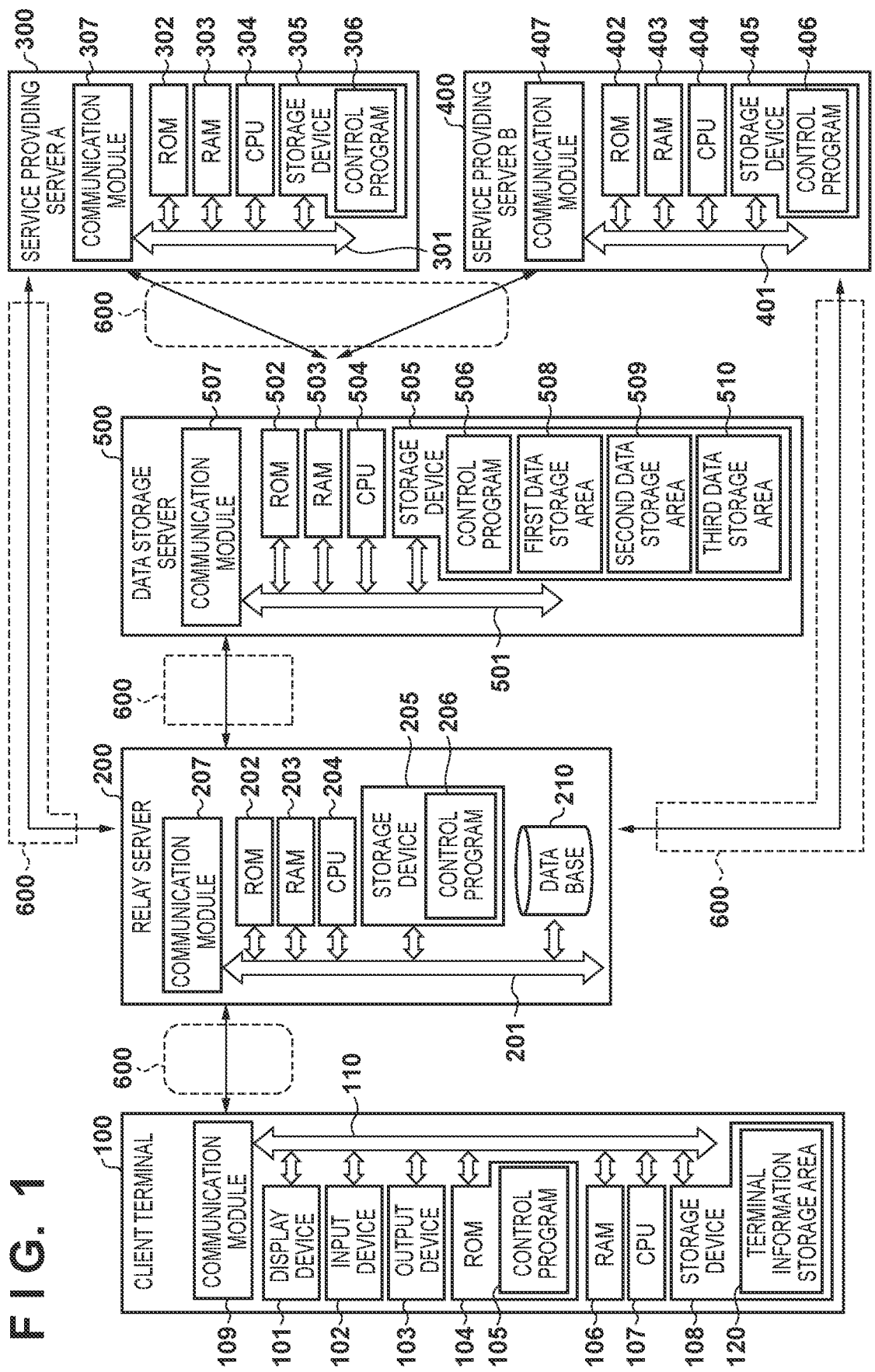
FIG. 1 is a view showing the configuration of a service providing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In Japanese Patent Laid-Open No. 2017-73167, if the configuration of the relay server must be changed when the service providing server acquires data of the client terminal, this change may exert an influence on the system.

As one aspect of the present invention, when the service providing server for acquiring data of the client terminal is added anew, the influence on the system caused by a change in configuration of the relay server can be suppressed.

First Embodiment

FIG. 1 is a view showing the configuration of a service providing system of this embodiment. The service providing system (to be referred to as a system hereinafter) of this embodiment includes a client terminal 100, a relay server 200, a service providing server A 300, a service providing server B 400, and a data storage server 500. When the client terminal 100 performs a process of registering itself to the relay server 200, the user of the client terminal 100 can receive services provided by the service providing servers A 300 and B 400. The service providing servers A 300 and B 400 perform a service registration process on the relay server 200 in order to provide the services to the client terminal 100.

In this embodiment, the data storage server 500 is installed between the relay server 200 and each service providing server. The data storage server 500 includes a first data storage area 508, a second data storage area 509, and a third data storage area 510, as storage areas capable of storing information transmitted from the relay server 200.

The client terminal 100 transmits data saved in the client terminal 100 to the relay server 200. The relay server 200 gives attribute information to the transmitted data. This attribute information is information of a service for which the client terminal 100 is registered. The relay server 200 determines one or more of the first, second, and third data storage areas 508, 509, and 510 of the data storage server 500, as data storage destinations, and transmits data to the data storage server 500. The data storage server 500 stores the transmitted data in the corresponding data storage area. After that, the service providing server A 300 or B 400 acquires data to be used in each service by designating the data storage area in the data storage server 500 and the attribute information, without using the relay server 200.

For example, when a new service providing server using a different data communication interface is added, it may become necessary to change the configuration of the data communication interface of the relay server 200. In this case, the influence on the system configuration before the addition of the service providing server is large. In this embodiment, therefore, the data storage server 500 is used in addition to the relay server 200, so even when a new service providing server is added, it is possible to prevent the influence on the system configuration before the addition of the service providing server from being increased.

The client terminal 100 is a terminal to be used by a user. For example, the client terminal 100 is an inkjet recording apparatus (printing apparatus) having a printing function and a scanning function. The relay server 200 is an apparatus connected to the client terminal 100 so that they can communicate with each other, and capable of exchanging various kinds of information with the client terminal 100. The service providing server A 300 is an apparatus capable of providing a service to the user of the client terminal 100. For example, when the client terminal 100 is an inkjet recording apparatus, the service providing server A 300 provides a service that gives points in accordance with the number of printed sheets, and a service that detects a shortage of the remaining ink amount in the client terminal 100 and automatically orders ink. In addition, the service providing server A 300 provides, for example, a service that prints data saved on the network, a service by which data scanned by the client terminal 100 is saved on a cloud across the network, and a service by which the user can unlimitedly use ink for a predetermined period by paying a predetermined amount of money. The service providing server B 400 is an apparatus that provides services different from those of the service providing server A 300.

The data storage server 500 is positioned between the relay server 200 and the service providing server A 300, and between the relay server 200 and the service providing server B 400. The data storage server 500 can save data transmitted from the relay server 200, and can provide data to each of the service providing servers A 300 and B 400 in response to a request from each service providing server.

The arrangement of each device shown in FIG. 1 will be explained. The client terminal 100 includes a communication module 109, a display device 101, an input device 102, an output device 103, a ROM 104, a RAM 106, a CPU 107, and a storage device 108. The display device 101 displays the result of input from the user to the client terminal 100, the result of execution of given processing, and the like. For example, the display device 101 displays a user interface screen for registering the client terminal 100 in the relay server 200, and can accept the setting contents. The input device 102 accepts instructions and the like from the user, and the output device 103 outputs deliverables based on the instructions and the like input by the input device 102. The deliverables are, for example, printed products.

The ROM 104 stores program codes to be executed by the client terminal 100, and the program codes are loaded into the RAM 106 and executed as needed. For example, the program codes include a control program 105 for controlling the communication module 109, the display device 101, the input device 102, the output device 103, and the RAM 106. The CPU 107 is an arithmetic processing device that comprehensively controls the client terminal 100. The storage device 108 is a device for storing data, and the CPU 107 executes data write/read. A terminal information storage area 120 is formed in the storage device 108, and stores information unique to the client terminal 100. An internal bus 110 connects the abovementioned blocks such that they can exchange data with each other.

The operation of the client terminal 100 of this embodiment is implemented by, for example, the CPU 107 by loading the control program 105 into the RAM 106 and executing the control program 105. For example, when the client apparatus 100 is an inkjet recording apparatus, the display device 101 displays a user interface screen for accepting the setting of a sheet size and the setting of color printing/monochrome printing. Then, when the input device 102 accepts the input of the printing settings and a printing instruction from the user, the output device 103 outputs a printed product based on the printing settings.

The control program 105 can include programs for forming data to be transmitted to the relay server 200. For example, the control program 105 includes a program for counting printed sheets, a program for detecting the remaining ink amount, and a program for determining whether ink is exclusively formed for a specific service. Also, as the information unique to the client terminal 100, the terminal information storage area 120 stores, for example, the serial number, the model name, the total number of printed sheets, the consumption amount of ink, the model number of ink, the cleaning date/time and the cleaning count of the recording head, and network information.

The relay server 200 includes a communication module 207, a ROM 202, a RAM 203, a CPU 204, and a storage device 205. The CPU 204 comprehensively controls the relay server 200. The storage device 205 stores a control program 206. The operation of the relay server 200 of this embodiment is implemented by, for example, the CPU 204 by loading the control program 206 into the RAM 203 and executing the control program 206. The relay server 200 also has a database 210 storing user information and information of service provision. In the service providing system, the relay server 200 manages the client terminal 100 and each service providing server. Therefore, as the user information and the information of service provision, the relay server 200 manages, for example, information of the client terminal 100 and information of each service providing server on the database 210. An internal bus 201 connects the abovementioned blocks so that they can exchange data with each other.

The service providing server A 300 includes a communication module 307, a ROM 302, a RAM 303, a CPU 304, and a storage device 305. The CPU 304 comprehensively controls the service providing server A 300. The storage device 305 stores a control program 306. The operation of the service providing server A 30 of this embodiment is implemented by, for example, the CPU 304 by loading the control program 306 into the RAM 303 and executing the control program 306. An internal bus 301 connects the abovementioned blocks so that they can exchange data with each other. The service providing server B 400 has the same arrangement as that of the service providing server A 300, and includes a communication module 407, a ROM 402, a RAM 403, a CPU 404, and a storage device 405. The CPU 404 comprehensively controls the service providing server B 400. The storage device 405 stores a control program 406. The operation of the service providing server B 400 of this embodiment is implemented by, for example, the CPU 404 by loading the control program 406 into the RAM 403 and executing the control program 406. An internal bus 401 connects the abovementioned blocks so that they can exchange data with each other.

The data storage server 500 includes a communication module 507, a ROM 502, a RAM 503, a CPU 504, and a storage device 505. The CPU 504 comprehensively controls the data storage server 500. The storage device 505 stores a control program 506. The operation of the data storage server 500 of this embodiment is implemented by, for example, the CPU 504 by loading the control program 506 into the RAM 503 and executing the control program 506. In this embodiment, the storage device 505 includes the first data storage area 508, the second data storage area 509, and the third data storage area 510, in order to store data transmitted from the relay server 200.

A network 600 shown in FIG. 1 is a communication network capable of data transmission/reception. The network 600 is implemented by one or a combination of, for example, the Internet, a LAN, a WAN, a telephone line, an exclusive digital line, an ATM, a frame relay line, a cable TV line, and a data broadcasting wireless channel.

Referring to FIG. 1, the client terminal 100 can also be a plurality of client terminals 100. The plurality of client terminals 100 can have either the same configuration or different configurations. FIG. 1 shows the relay server 200 as a single apparatus, but the relay server 200 can also be a plurality of apparatuses. In this case, the plurality of relay servers 200 can have a plurality of functions. In addition, FIG. 1 shows two service providing servers, that is, the service providing servers A 300 and B 400, but the number of the service providing servers can also be one, or three or more. When there are a plurality of service providing servers, they can provide either the same service or different services. Furthermore, FIG. 1 shows the data storage server 500 as a single apparatus, but the data storage server 500 can also be a plurality of apparatuses.

Figure 2:
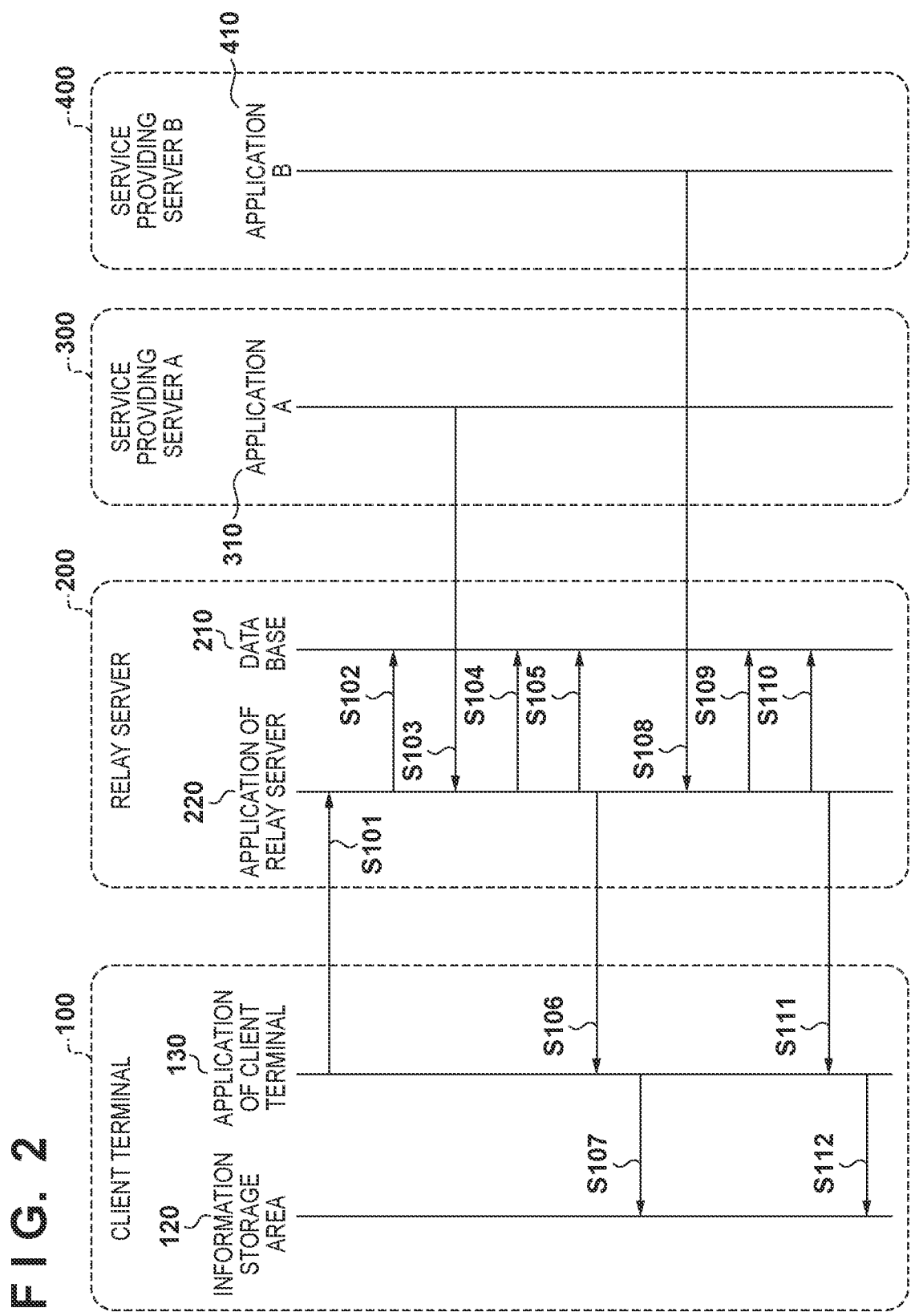
FIG. 2 is a sequence chart showing the process of registration to a relay server.
Figure 3:
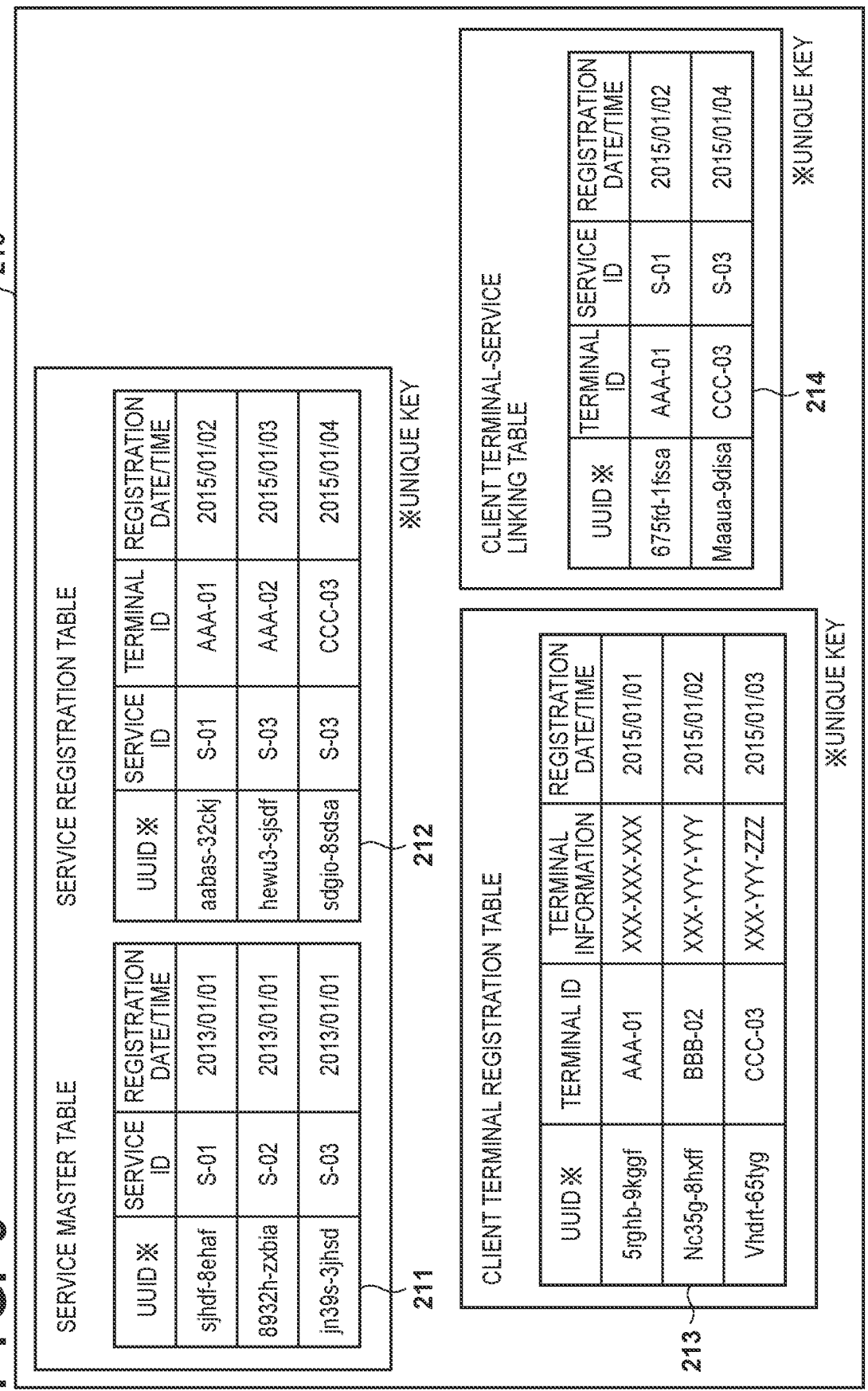
FIG. 3 is a view showing data stored in a database of the relay server.

FIG. 2 is a sequence chart showing a process by which the client terminal 100 and the service providing servers A 300 and B 400 perform registration for the relay server 200. The client terminal 100 registers itself in the relay server 200. The service providing servers A 300 and B 400 register services that can be provided to the designated client terminal 100, in the relay server 200. FIG. 3 is a view showing examples of data stored in the database 210 of the relay server 200. FIG. 2 will be explained below with reference to FIG. 3.

An application 130 installed in the client terminal 100 requests the relay server 200 for a registration process (step S101). An application 220 of the relay server 200 having received this registration process request generates a record having an ID (to be referred to as a terminal ID hereinafter) for identifying the client terminal 100 as an attribute value, by using a unique ID (to be referred to as a UUID hereinafter) as a key (step S102). In this step, as shown in a client terminal registration table 213 of FIG. 3, attribute values may contain detailed information of the terminal (terminal information) and the registration date/time.

An application 310 in the service providing server A 300 requests the relay server 200 for a process of registering a service and a terminal ID that can receive the provision of the service (step S103). In a service master table 211 in the database 210 of the relay server 200, an ID (to be referred to as a service ID hereinafter) for identifying each service is preset by using a UUID unique to the service as a key. In response to the registration process request from the service providing server A 300, the application 220 of the relay server 200 generates a record having the service ID of each service and the terminal ID as attribute values by using the unique UUID as a key (step S104). In this step, attribute values may also contain the registration date/time and the like, as shown in a service registration table 212 of FIG. 3.

Then, the application 220 of the relay server 200 searches for a record in which the terminal ID registered in step S104 matches the terminal ID in the client terminal registration table 213. If a record having the same terminal ID is found, the application 220 determines that linking between the terminal ID and the service is complete, and generates a record having the terminal ID and the service ID as attribute values by using a new UUID as a key (step S105). In this step, the attribute values may also contain another information such as the registration date/time as shown in a client terminal-service linking table 214 of FIG. 3. On the other hand, if no record having the same terminal ID is found, the application 220 waits for the registration process request from the client terminal 100 in step S101.

When the registration of linking between the terminal ID and the service is complete, the application 220 of the relay server 200 notifies the client terminal 100 that the client terminal 100 has completed preparations for receiving service A of the service providing server A 300 (step S106). In this step, information necessary to use service A of the service providing server A 300 can also be notified. For example, a user ID or a password necessary to log in to the service can also be notified. The application 130 of the client terminal 100 stores the information notified in step S106 into the information storage area 120 (step S107).

The above processing is performed for service B of the service providing server B 400 in the same manner as in steps S103 to S107.

An application 410 in the service providing server B 400 requests the relay server 200 for a process of registering a service and a terminal ID capable of receiving the provision of the service (step S108). In response to this registration process request from the service providing server B 400, the application 220 of the relay server 200 generates a record having the service ID of each service and the terminal ID as attribute values by using a unique UUID as a key (step S109). In this step, attribute values may also contain the registration date/time or the like as shown in the service registration table 212 of FIG. 3.

Then, the application 220 of the relay server 200 searches for a record in which the terminal ID registered in step S109 matches the terminal ID in the client terminal registration table 213. If a record having the same terminal ID is found, the application 220 determines that linking between the terminal ID and the service is complete, and generates a record having the terminal ID and the service ID as attribute values by using anew UUID as a key (step S110). In this step, attribute values may also contain another information such as the registration date/time as shown in the client terminal-service linking table 214 of FIG. 3. On the other hand, if no record having the same terminal ID is found, the application 220 waits for the registration process request from the client terminal 100 in step S101.

When the registration of linking between the terminal ID and the service is complete, the application 220 of the relay server 200 notifies the client terminal 100 that the client terminal 100 has completed preparations for receiving service B of the service providing server B 400 (step S111). In this step, information necessary to use service B of the service providing server B 400 can also be notified. For example, a user ID or a password necessary to log in to the service can also be notified. The application 130 of the client terminal 100 stores the information notified in step S111 into the information storage area 120 (step S112).

The procedure by which the client terminal 100 initially registers itself in the relay server 200 and then each service providing server registers a service in the client terminal 100 has been explained with reference to FIG. 2. However, the order of these registrations may also be reversed. In addition, the present invention is not limited to the above-described configuration as long as the process of registering the client terminal 100 and the process of registering the service of each service providing server can be implemented. For example, the service providing server A 300 can also perform the registration process on the relay server 200 via another server (not shown).

As described above, the client terminal-service linking table 214 in the database 210 of the relay server 200 stores a list of services for which the client terminals 100 are registered. As a consequence, the user of the client terminal 100 can receive the corresponding service.

The process of storing data in the data storage server 500 will be explained below with reference to FIG. 4. Assume that service A of the service providing server A 300 is registered in the client terminal-service linking table 214 as a service corresponding to the client terminal 100. After the procedure of registering service A in the service providing server A 300 shown in FIG. 2 is complete, the client terminal 100 transmits a plurality of data to the relay server 200. For example, data A 1001 and data B 1002 are transmitted as transmission data 1000 to the relay server 200. The relay server 200 gives attribute information and information of a data storage destination (data storage area) in the data storage server 500 to each of the plurality of data, and transmits the data to the data storage server 500. For example, data A 1003 obtained by giving "attribute A" and information of "first data storage area" to the data A 1001 is transmitted from the relay server 200 to the data storage server 500. Also, data B 1004 obtained by giving "attribute A" and information of "third data storage area" to the data B 1002 is transmitted from the relay server 200 to the data storage server 500. "Attribute A" is given because service A of the service providing server A 300 is registered as a service for which the client terminal 100 is registered, so "attribute A" is given to all data to be transmitted from the client terminal 100. Also, as an example of the information of a data storage area, a predetermined storage destination corresponding to the type of data is set. In accordance with the given data storage destination information, the data storage server 500 stores the data in the data storage area. For example, the data storage server 500 stores the data A 1003 in the first data storage area 508 in accordance with "first data storage area", and stores the data B 1004 in the third data storage area 510 in accordance with "third data storage area". After that, the data storage server 500 notifies the service providing server A 300 of the data storage area, so the service providing server A 300 designates, for example, "attribute A" representing service A. Upon receiving this designation, the data storage server 500 extracts (performs filtering for) the information given "attribute A" from the data contained in the first data storage area. That is, the service providing server A 300 can acquire data A 1005 from the first data storage area of the data storage server 500 by designating the attribute information "attribute A".

Note that the relay server 200 can give various kinds of attribute values as the above-described attribute information. Examples are the following information.

1. An attribute value that is changed in accordance with the type of data acquired from a client terminal (for example, a printer). For example, different attribute values are given to the number of printed sheets and the ink remaining amount.

2. An attribute value that is changed by a printer to which data is transmitted. For example, different attribute values are given when printers to which data is transmitted are printer A and printer B. In this case, the relay server 200 looks up the client terminal registration table 213.

3. An attribute value that is changed by a service corresponding to a printer to which data is transmitted. Assume that the service IDs of different services A and B are linked to the same terminal ID in the client terminal-service linking table 214. In this case, even for the remaining ink amount obtained from the printer, different attribute values are given to the remaining ink amount for service A and the remaining ink amount for service B.

4. An attribute value that is changed by combinations of items 1 to 3 described above. For example, a unique attribute value is given by a combination of a printer to which data is transmitted, the type of the printer, and the type of service linked to the printer.

Also, the service providing server can acquire desired data extracted from the data storage server 500 by designating the attribute values of items 1 to 4 described above. For example, when the attribute value changes in accordance with the type of data as described in item 1 above, the service providing server designates an attribute value corresponding to the type of data necessary for the server. When the attribute value changes in accordance with the type of printer as described in item 2 above, the service providing server designates an attribute value corresponding to a printer to which the server provides a service.

When the attribute value changes in accordance with the type of service as described in item 3, the service providing server designates an attribute value corresponding to a service that the server provides. In this case, the service server designates a fixed value.

Also, in the case of item 4 described above, the service providing server designates an attribute value corresponding to a service that the server provides and the type of desired data.

Data 1001 and data 1002 shown in FIG. 5 indicate examples of data to be transmitted from the client terminal 100 to the relay server 200, and respectively correspond to the data A 1001 and the data B 1002 shown in FIG. 4. Also, data 1003 and data 1004 shown in FIG. 5 indicate examples of data to be transmitted from the relay server 200 to the data storage server 500, and respectively correspond to the data A 1003 and the data B 1004 shown in FIG. 4. FIG. 5 shows data when the client terminal 100 is an inkjet printing apparatus. For example, the data 1001 is data of the number of sheets printed for a predetermined period by the client terminal 100, and is used in a service for giving points in accordance with the number of printed sheets. As shown in FIG. 5, the data 1001 can also contain, for example, the type of printed sheets, the sheet size, the consumption amount of ink used in printing, individual information of ink, the cleaning count, and information unique to the printing apparatus. Also, the data 1002 is data indicating remaining ink amount information, and is used in a service that detects a shortage of the remaining ink amount and automatically orders ink. As shown in FIG. 5, the data 1002 indicates the remaining ink amount for each color, that is, Low for black and Full for magenta, yellow, and cyan. The data 1001 and 1002 may also contain information other than those shown in FIG. 5.

As shown in the data 1003, "first data storage area" as the information of a data storage area and "attribute A" as the attribute information are given to the data 1001. It is also possible to give another information, for example, information of the data reception day. Also, as shown in the data 1004, "third data storage area" as the information of a data storage area and "attribute A" as the attribute information are given to the data 1002. It is also possible to give another information, for example, information of the data reception day.

The service providing server A 300 is a server that provides a service for giving points in accordance with the number of printed sheets. As shown in FIG. 4, therefore, to acquire data necessary for the service, the service providing server A 300 acquires the data A 1005 from the first data storage area of the data storage server 500 by designating "attribute A" representing service A. Note that in this embodiment as described previously, "attribute A" corresponding to service A of the service providing server A 300 is given to the data B 1002 that the service providing server A 300 does not require for its own service. The effect in this case will be described later.

Figure 6:
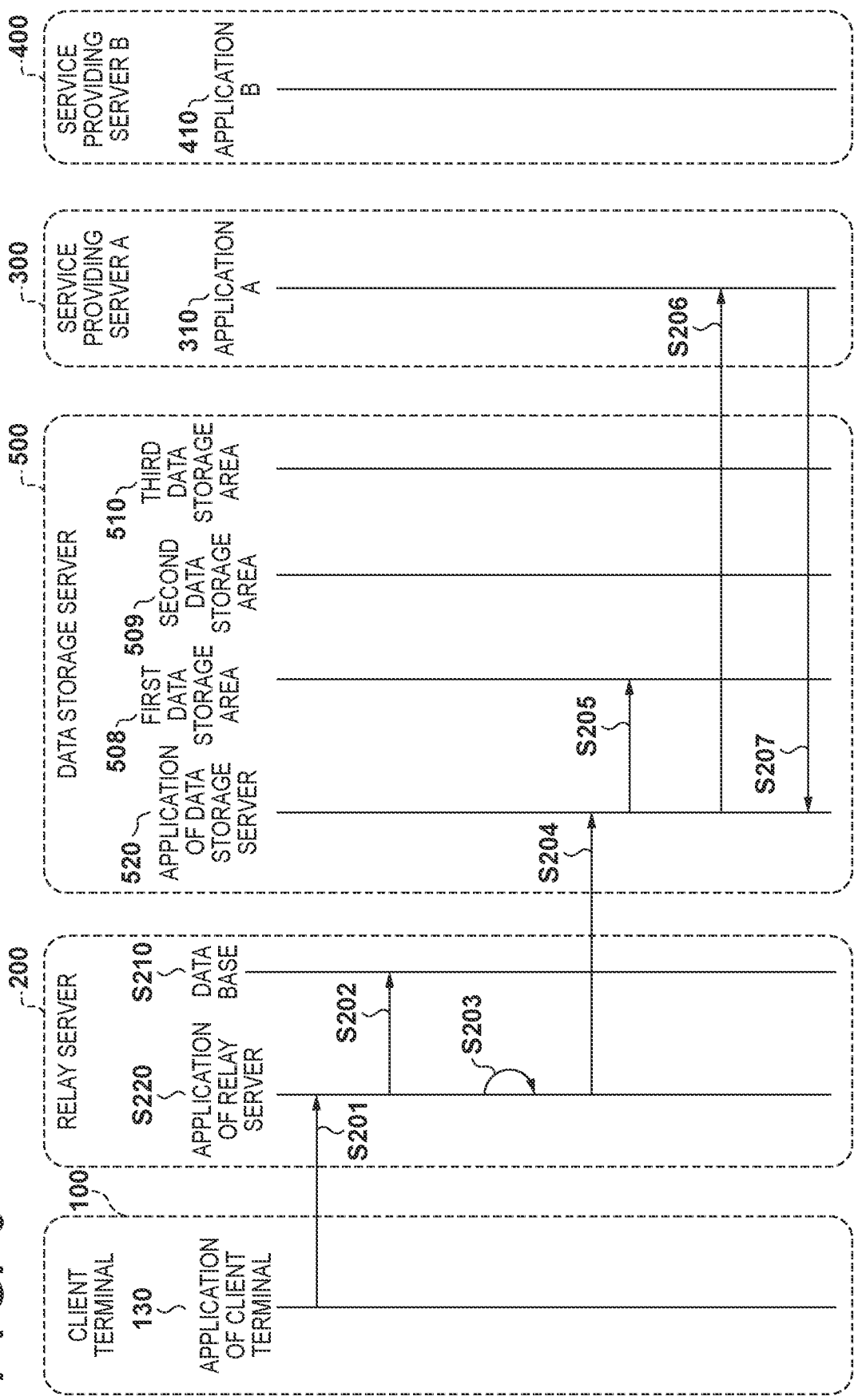
FIG. 6 is a sequence chart of the process of the transmission of data to the data storage service.

FIG. 6 is a sequence chart showing the process of data transmission. An operation in which the service providing server A 300 acquires data from the data storage server 500 after service A of the service providing server A 300 is registered will be explained below with reference to FIGS. 4 to 6.

As shown in FIG. 6, the application 130 of the client terminal 100 transmits the transmission data 1000 (the data A 1001, the data B 1002) to the relay server 200 (step S201). In this step, the transmission data 1000 represents the data A 1001 and the data B 1002. A communication protocol for transmitting these data can be, for example, HTTP (Hypertext Transfer Protocol). It is also possible to use, for example, MQTT (Message Queuing Telemetry Transport) or XMPP (Extensible Messaging and Presence Protocol). The URL (Uniform Resource Locator) of the transmission destination of the relay server 200 can change for different data and can also remain the same.

Upon receiving the data A 1001 and the data B 1002, the application 220 of the relay server 200 stores the data in the database 210 (step S202). When at least one service is registered for the client terminal 100, the application 220 gives attribute information to all the received data (step S203), and transmits the data to the data storage server 500 (step S204). If the plurality of data have different transmission destinations in the relay server 200, the application 220 can also determine a data storage area in the data storage server 500 in accordance with each transmission destination. For example, if the transmission destination of the data A 1001 is set to URL_A of the relay server 200 and that of the data B 1002 is set to URL_B of the relay server 200, the data A 1001 can be transmitted to the first data storage area 508, and the data B 1002 can be transmitted to the third data storage area 510. In this case, the URL can also be predetermined in accordance with the type of data.

In this embodiment, all pieces of attribute information linked to services for which the client terminal 100 is registered are given. For example, if the service registered for the client terminal 100 is service A of the service providing server A 300, "attribute A" is given as indicated by the data A 1003 and the data B 1004. As already described above, the service list in which the client terminal 100 is registered is stored in the client terminal-service linking table 214 in the database 210 of the relay server 200. The relay server 200 gives attribute information by looking up the table. For example, if service A of the service providing server A 300 is already registered in the service registration table 212, a record containing a pair of the service ID and the terminal ID is stored in the client terminal-service linking table 214. The relay server 200 refers to this record, and recognizes that the client terminal 100 is registered for service A of the service providing server A 300.

As the attribute information to be given, a term representing the service name or the contents of the service can be used. For example, service A of the service providing server A 300 is a service for giving points in accordance with the number of printed sheets, so "print log" may also be set instead of "attribute A". If the service detects a shortage of the remaining ink amount and automatically orders ink, a service name such as "automatic order service" may also be set.

Upon receiving the data (the data A 1003, the data B 1004) from the relay server 200, an application 520 of the data storage server 500 stores the data in the designated data storage area (step S205). For example, the application 520 stores the data A 1003 in the first data storage area 508 in accordance with "first data storage area", and stores the data B 1004 in the third data storage area 510 in accordance with "third data storage area".

Then, the application 520 of the data storage server 500 notifies the service providing server that the data is stored, in accordance with the data storage area of the storage destination (step S206). In this step, the service providing server as the notification destination can be a service providing server that is predetermined for the data storage area, and can also be all service providing servers. For example, setting can be performed such that if data is stored in the first data storage area 508, the service providing server A 300 is notified of this information. In this embodiment, if data is stored in the first data storage area 508, the service providing server A 300 is notified of this information.

The service providing server having received the notification from the data storage server 500 acquires the data from the data storage area of the data storage server 500 by designating the attribute information (step S207). For example, upon receiving notification indicating that data is stored in the first data storage area 508, the service providing server A 300 acquires the data from the first data storage area 508 by designating the attribute information, for example, "attribute A". This designation of the attribute information is performed by designating only the attribute information corresponding to each service providing server. If "print log" is set instead of "attribute A", the service providing server A 300 acquires the data from the first data storage area 508 by designating "print log".

Figure 7:
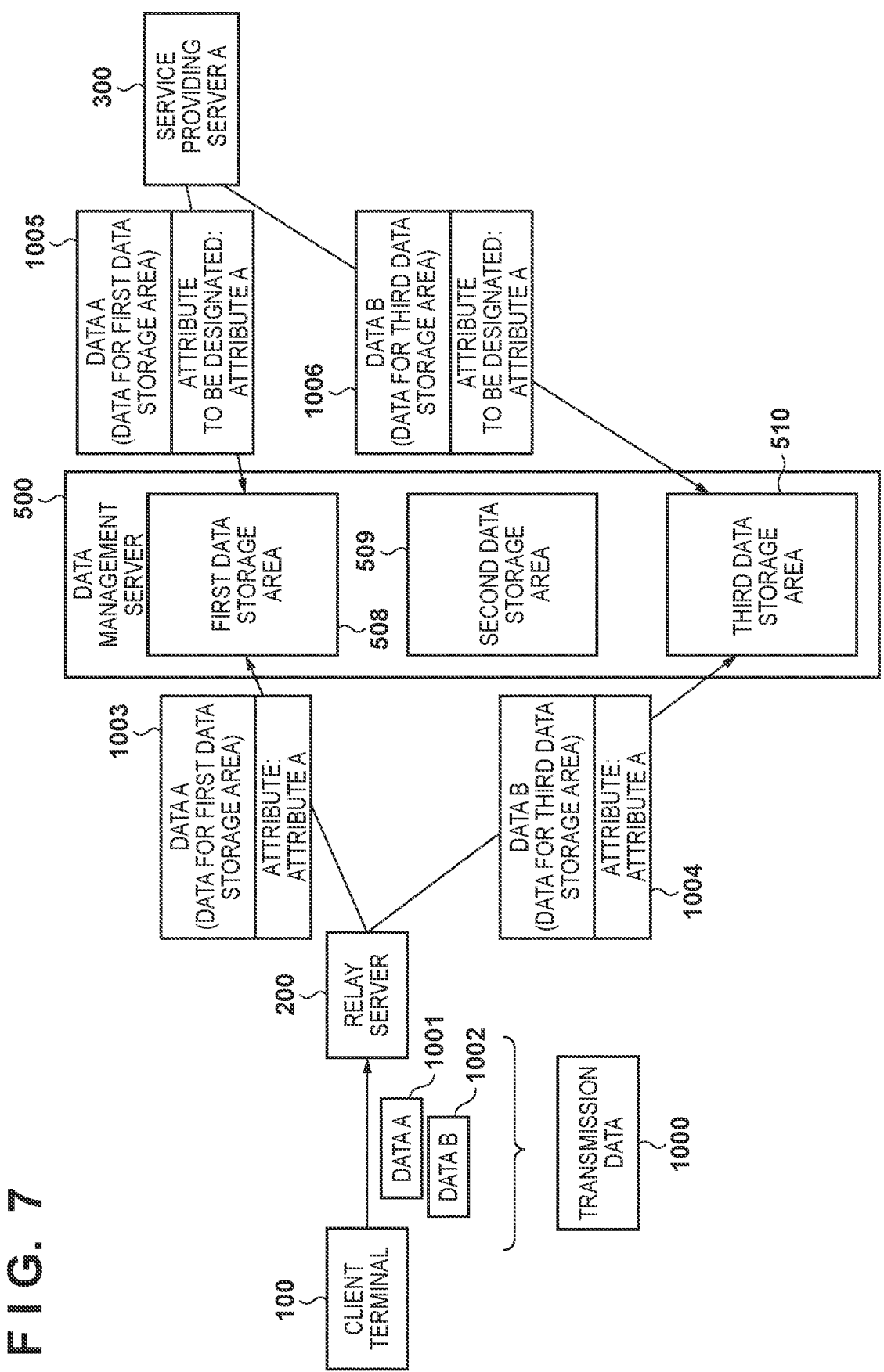
FIG. 7 is a view for explaining data acquisition by a service providing server.

A case in which the service providing server A 300 acquires the data B 1004 in order to expand services will be explained below with reference to FIG. 7. That is, assume a case in which the service providing server A 300 performs service expansion so that service A and service B can be provided. FIG. 7 is a view showing that the service providing server A 300 acquires data from the third data storage area 510 by designating the attribute information.

The data B 1004 is already stored in the third data storage area 510 of the data storage server 500. Therefore, the service providing server A 300 acquires data from the third data storage area 510 of the data storage server 500 by designating "attribute A" as the attribute information. As described above, the relay server 200 gives the attribute information of a service for which the client terminal 100 is registered, to all the data (the data A 1001, the data B 1002) received from the client terminal 100. That is, the service providing server A 300 acquires the data A 1005 from the first data storage area 508 of the data storage server 500 in order to use the data in service A. Then, the service providing server A 300 acquires data B 1006 from the third data storage area 510 of the data storage server 500 without using the relay server 200 in order to use the data in service B after service expansion. In a configuration like this, even when the service providing server A 300 expands services, the arrangement of the relay server 200 need not be changed in order to provide the service providing server A 300 with data for the service that the service providing server A 300 has become able to provide. This makes it possible to prevent the influence on the system from being increased by the change in configuration of the relay server 200.

Figure 8:
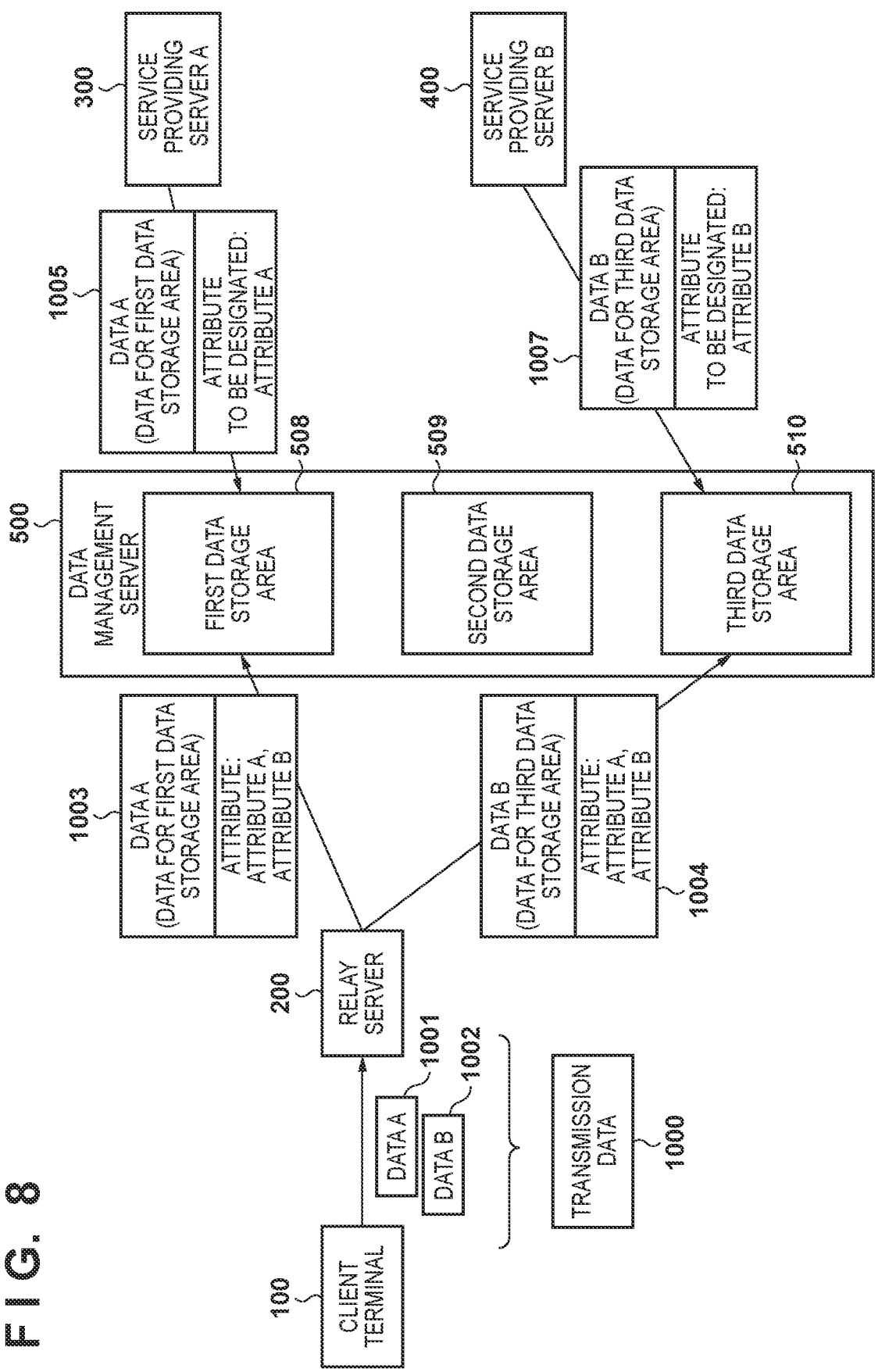
FIG. 8 is a view for explaining data acquisition by the service providing server.

A case in which service B of the new service providing server B 400 is registered for the client terminal 100 and the service providing server B 400 acquires the data B 1004 from the third data storage area 510 will be explained below with reference to FIG. 8. FIG. 8 is a view showing that the service providing server A 300 acquires data from the first data storage area 508 by designating the attribute information, and the service providing server B 400 acquires data from the third data storage area 510 by designating the attribute information.

As already described above, when at least one service is registered for the client terminal 100, the relay server 200 transmits all data transmitted from the client terminal 100 to the data storage server 500. If service B of the service providing server B 400 is registered, the relay server 200 gives "attribute A" and "attribute B" respectively corresponding to service A and service B as the attribute information to the data A 1001 and the data B 1002. That is, the relay server 200 gives the attribute information of "attribute A" and "attribute B" to the data B 1002, and transmits the data to the third data storage area 510.

Assume that the service providing server A 300 is a server for providing a service that gives points in accordance with the number of printed sheets, and the service providing server B 400 is a server for providing a service that detects a shortage of the remaining ink amount and automatically orders ink. If these two services are already registered in the relay server 200, the service ID and the terminal ID of each of the two services are registered as records in the client terminal-service linking table 214. The relay server 200 gives the attribute information by referring to the records. Since the two services are registered for the client terminal 100, "attribute A" and "attribute B" are the attribute information to be given. It is also possible to give "print log" instead of "attribute A", and "automatic order service" instead of "attribute B", as the attribute information.

The service providing server B 400 acquires data from the third data storage area 510 of the data storage server 500 by designating the attribute information "attribute B" corresponding to service B without using the relay server 200. Consequently, the service providing server B 400 can use the data B 1002 of the client terminal 100 in the service.

In a configuration like this, even when service B of the new service providing server B 400 is registered for the client terminal 100, the configuration of the relay server 200 need not be changed in order to provide data of the client terminal 100 to the new service providing server B 400. This makes it possible to prevent the influence on the system from being increased by the change in configuration of the relay server 200.

Second Embodiment

The differences of the second embodiment from the first embodiment will be explained below. In this embodiment, a case in which a new data storage area is added to a data storage server 500 will be explained with reference to FIGS. 9 and 10.

Figure 9:
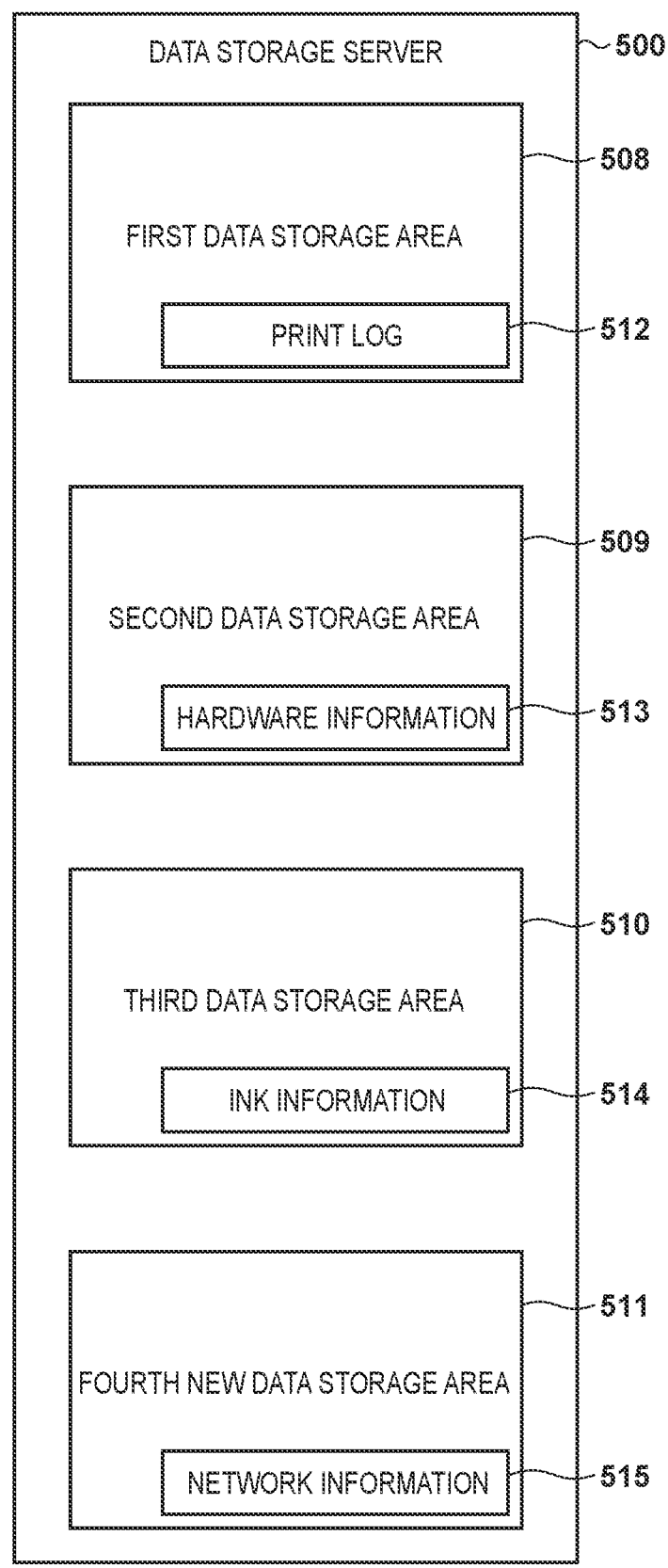
FIG. 9 is a view showing the configuration of data storage areas of the data storage server.

In this embodiment, an application 520 of the data storage server 500 assigns a unique identifier (identification information) to each data storage area. As shown in FIG. 9, if a first data storage area 508 is a storage area for data of the number of printed sheets, the application 520 assigns "print log" as an identifier 512. Also, if a second data storage area 509 is a storage area for data of hardware information of a printing apparatus, the application 520 assigns "hardware information" as an identifier 513. In addition, if a third data storage area 510 is a storage area for data of ink information, the application 520 assigns "ink information" as an identifier 514. That is, information with which the type of stored data can be identified is used as the identifier.

When a client terminal 100 transmits new data C (for example, data of network information) to a relay server 200, a fourth data storage area 511 is added as a new data storage area to the data storage server 500. In this case, the application 520 of the data storage server 500 assigns an identifier "network information" to the fourth data storage area 511.

Figure 10:
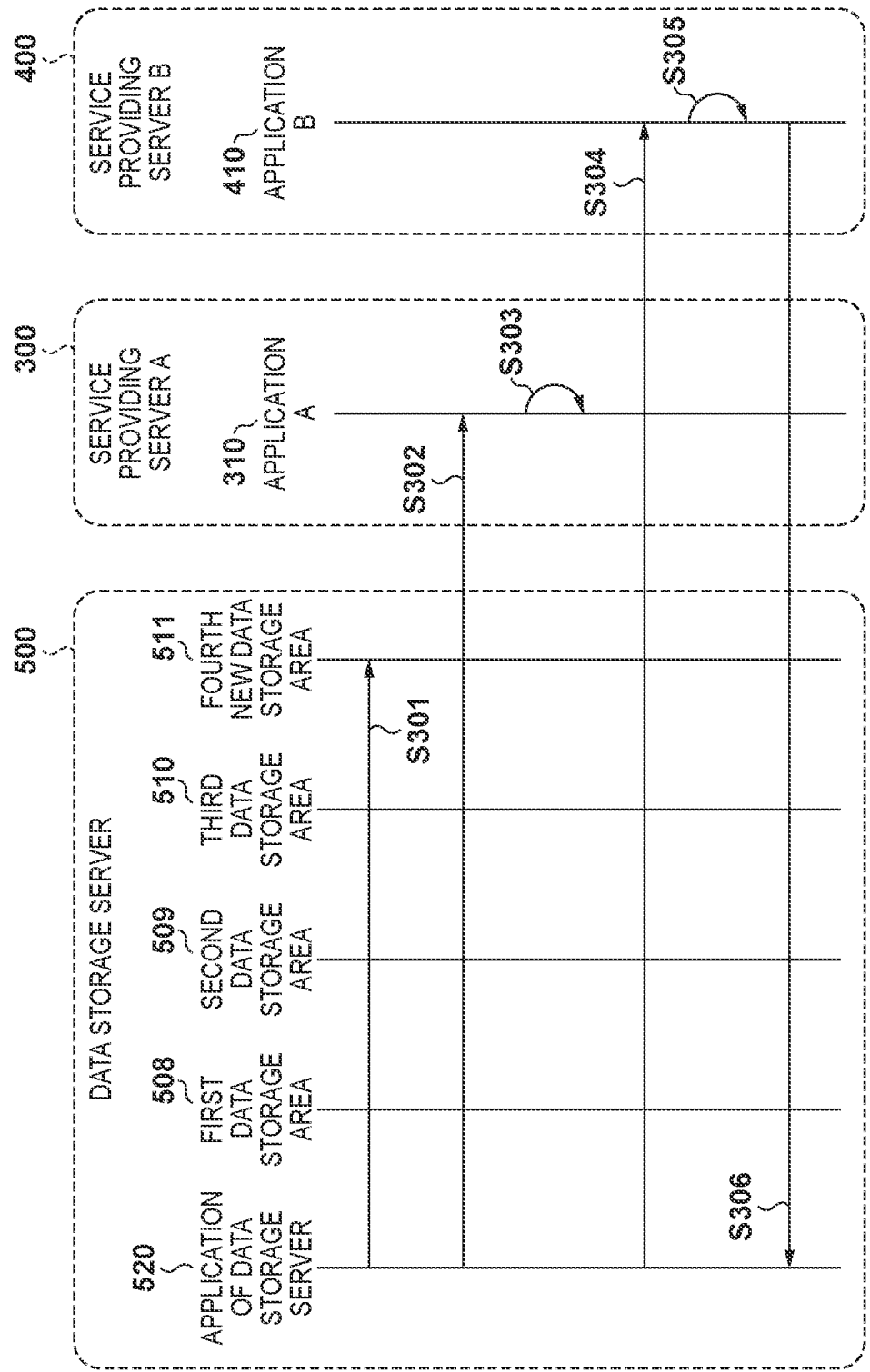
FIG. 10 is a sequence chart of the process of the addition of data storage areas.

As shown in FIG. 10, if the application 520 of the data storage server 500 detects the addition of the fourth data storage area 511 (step S301), the application 520 notifies each service providing server of the addition of the new data storage area, together with "network information" as an identifier 515 assigned to the fourth data storage area 511 (steps S302 and S304). For example, the application 520 notifies a service providing server A 300 and a service providing server B 400 of the addition of the fourth data storage area 511 as a new data storage area.

Based on the notified identifier, each service providing server determines whether the fourth data storage area 511 is a storage area for data to be acquired by the server (steps S303 and S305). For example, if the identifier assigned to the fourth data storage area 511 is "network information", each service providing server determines whether the fourth data storage area 511 is a storage area for data to be acquired, based on the identifier "network information". If it is determined that the fourth data storage area 511 is a storage area for data to be acquired, the service providing server having performed this determination acquires data from the fourth data storage area 511 by designating the attribute information "network information" (step S306).

In this embodiment as described above, when a new data storage area is added in the data storage server 500, each service providing server is notified of the new data storage area and the identifier. In a configuration like this, each service providing server is notified of the identifier together with information of the new data storage area, so the service providing server can determine whether the new data storage area is an acquisition source of data to be used in its service. Then, the service providing server having determined that the new data storage area is an acquisition source of data can acquire data from the new data storage area without using the relay server 200. Therefore, even when the client terminal 100 transmits new data to the relay server 200, the configuration of the relay server 200 need not be changed in order to transmit the data to the service providing server. This makes it possible to prevent the influence on the system from being increased by the change in configuration of the relay server 200.

In the explanation of this embodiment, the application 520 of the data storage server 500 assigns the identifier to each data storage area. However, the relay server 200 can also assign the identifier to data to be transmitted to the data storage server 500. In this case, the relay server 200 can also determine whether to transmit data to the data storage server 500, based on the identifier. A configuration like this can prevent data not to be used in a service of a service providing server from being transmitted to the data storage server 500.

Third Embodiment

Figure 11:
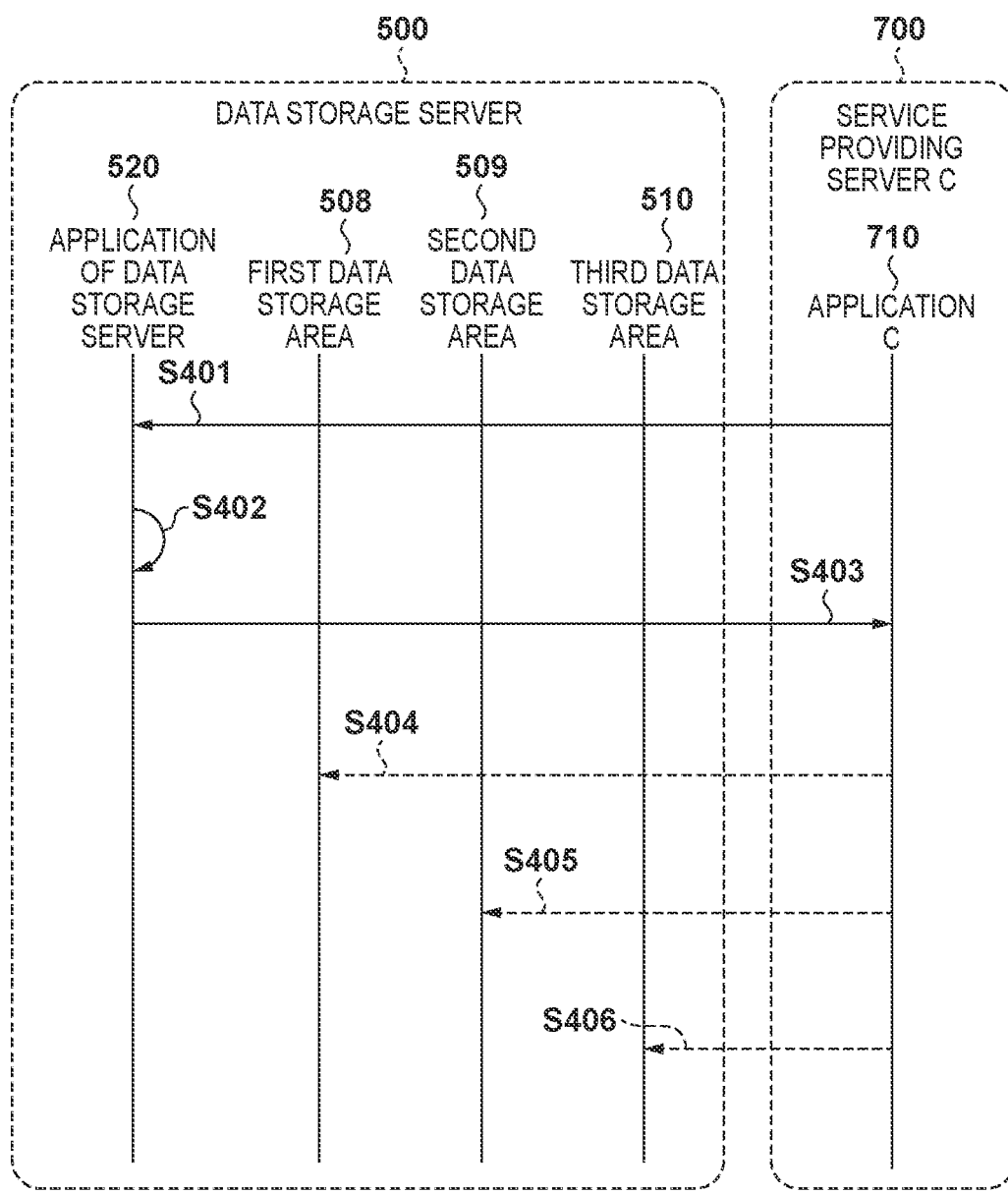
FIG. 11 is a sequence chart of the process of the addition of a service providing server.

The differences of the third embodiment from the first and second embodiments will be explained below. In this embodiment, a case in which a new service providing server (a service providing server C 700) is added will be explained with reference to FIG. 11.

An application C 710 of the service providing server C 700 notifies an application 520 of a data storage server 500 of the addition of a new service, together with information describing the contents of the new service (step S401). Upon receiving this notification, the application 520 of the data storage server 500 determines a data storage area from which the new service providing server C 700 acquires data, based on the information describing the contents of the new service (step S402). An identifier explained in the second embodiment may also be used in this determination. Then, the application 520 of the data storage server 500 notifies the service providing server C 700 of the result (step S403). Upon receiving this notification, the application C 710 of the service providing server C 700 acquires data from the notified data storage area. For example, if it is determined in step S402 that the service providing server C 700 can acquire data from first to third data storage areas 508 to 510, the application C 710 of the service providing server C 700 acquires data from these data storage areas in steps S404, S405, and S406.

For example, if the newly added service providing server C 700 provides a service for printing data on a cloud, "cloud print service" is notified as the contents of the new service. Based on "cloud print service" as the contents of the new service, the application 520 of the data storage server 500 determines a data storage area from which the service providing server C 700 acquires data.

Assume that a service forgiving points in accordance with the number of printed sheets, which is provided by a service providing server A 300, is already registered in a relay server 200 with respect to a client terminal 100. Assume also that a service that detects a shortage of the remaining ink amount and automatically orders ink, which is provided by a service providing server B 400, is already registered in the relay server 200 with respect to the client terminal 100. When the service for printing data on a cloud, which is provided by the service providing server C 700, is further registered in the relay server 200, three service IDs are registered for the same terminal ID in a client terminal-service linking table 214 of the relay server 200. For example, the relay server 200 gives three pieces of attribute information "print log", "automatic order service", and "cloud printing" to the same terminal ID. In this embodiment, the processing shown in FIG. 11 further notifies the service providing server C 700 of information of a data storage area as the data acquisition source.

In this embodiment as described above, when a new service providing server is added, the data storage server 500 notifies the new service providing server of a data storage area in which data to be acquired by the new service providing server is stored. In a configuration like this, even when a new service providing server is added, data to be used in a service can be provided to the new service providing server without using the relay server 200. This can prevent the influence on the system from being increased by the change in configuration of the relay server 200.

Also, in the explanation of this embodiment, the data storage server 500 determines a data storage area in which data to be acquired by a new service providing server is stored. However, it is also possible to notify a new service providing server of all data storage areas. In this case, the new service providing server having received the notification can scan all the data storage areas, and, based on the identifier assigned to each data storage area, can determine whether data is necessary for a service of the server.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-064199, filed Mar. 31, 2020, which is hereby incorporated by reference herein in its entirety.

What is claimed is:

1. A system including a client terminal, a first service providing server configured to provide a service to the client terminal, and a second service providing server configured to provide a service to the client terminal, wherein the system comprises:
  a relay server configured to manage the client terminal, the first service providing server, and the second service providing server; and
  a data storage server installed between the relay server and the first and second service providing servers,
  the relay server comprises:
  at least one memory storing instructions; and
  at least one processor that executes stored instructions to manage information that links the client terminal and the services provided by the first and second service providing servers;
  based on the managed information, give information for specifying each of the first and second services provided by the first and second service providing servers as attribute information to first and second data transmitted from the client terminal, wherein the first data is data associated with a first service provided by the first service providing server and the second data is data associated with a second service provided by the second service providing server; and transmit, to the data storage server, the first and second data given the attribute information, and
  the data storage server comprises a first data storage area, a second data storage area, and a third data storage area as storage areas capable of storing information transmitted from the relay server, and the data storage server comprises at least one memory storing instructions, and at least one processor that executes stored instructions to store the first data transmitted in the first data storage area and store the second data transmitted in the second data storage area, and
  each of the first and second service providing servers comprises at least one memory storing instructions and at least one processor that executes stored instructions to acquire the first and second data from the storage area by designating the attribute information, and corresponding to each of the first and second services provided by the first and second service providing servers,
  wherein the relay server determines one or more of the first, second, and third data storage areas of the data storage server as data storage destinations,
  wherein the at least one processor of the relay server further executes stored instructions to register the first and second services provided by the first and second service providing servers and a client terminal corresponding to the first and second services, in response to a request from the first and second service providing servers, and
  wherein the first and second service providing servers in the managed information are service providing servers corresponding to the first and second services registered.

2. The system according to claim 1, wherein even when the first service providing server does not use the second data in the first service provided by the first service providing server, the information of the first service provided by the first service providing server is given as the attribute information to the second data.

3. The system according to claim 1, wherein the at least one processor of the relay server further executes stored instructions to register information of the client terminal in response to a request from the client terminal, and
  the client terminal in the managed information is a client terminal in which information of the client terminal is registered.

4. The system according to claim 1, wherein the at least one processor of the data storage server further executes instructions to, when the first and second data transmitted is stored in the first and second areas of the storage area, transmit information of the first and second areas in which the first and second data is stored to the first and second service providing servers, and
  each of the first and second service providing servers acquires data corresponding to each of the first and second services provided by the first and second service providing servers from the storage area, based on the information of the first and second areas in which the first and second data is stored.

5. The system according to claim 1, wherein the information of the first and second areas in which the first and second data is stored is transmitted to the first and second service providing servers linked to the first area and the second area.

6. The system according to claim 1, wherein the information of the first and second areas in which the first and second data is stored is transmitted to the first and second service providing servers in the managed information.

7. The system according to claim 6, wherein the information of the first and second areas in which the first and second data is stored is transmitted to all of a plurality of service providing servers in the managed information.

8. The system according to claim 1, wherein when the client terminal transmits third data different from the first data and the second data, the third data is stored in an added third area of the storage area.

9. The system according to claim 8, wherein each of the information of the first and second areas in which the first and second data is stored is an identifier assigned to an area, and the identifier is information with which data stored in an area can be identified.

10. The system according to claim 9, wherein each of the first and second service providing servers are further configured to determine, based on the identifier, whether an area corresponding to the identifier is a data acquisition source.

11. The system according to claim 9, wherein the at least one processor of the data storage server further executes instructions to, if a new service providing server is detected, determine, based on the identifier, whether an area corresponding to the identifier is a data acquisition source of the new service providing server, and
  information of the area determined to be the data acquisition source of the new service providing server is transmitted to the new service providing server as the information of the area in which data is stored.

12. The system according to claim 1, wherein the client terminal is a printing apparatus.

13. A relay server capable of communicating with a client terminal, a first service providing server configured to provide a service to the client terminal, and a second service providing server configured to provide a service to the client terminal, comprising:
  at least one memory storing instructions; and at least one processor configured to execute instructions to
manage information that links the client terminal and
the services provided by the first and second service
providing servers;
give, based on the managed information, information for specifying each of the first and second services provided by the first and second service providing servers to first and second data transmitted from the client terminal, as attribute information for the first and second service providing servers, wherein the first data is data associated with a first service provided by the first service providing server and the second data is data associated with a second service provided by the second service providing server; and
transmit the first and second data to which the attribute information is given, to a data storage server installed between the relay server and the first and second service providing servers, wherein the relay server is configured to determine one or more of first, second, and third data storage areas of the data storage server as data storage destinations for the first and second data to which the attribute information is given that is transmitted to the data storage server, wherein the at least one processor of the relay server further executes stored instructions to register the first and second services provided by the first and second service providing servers and the client terminal corresponding to the first and second services, in response to a request from the first and second service providing servers, and wherein the first and second service providing servers in the managed information are service providing servers corresponding to the first and second services registered.

* * * * *